United States Patent
Nakano et al.

[19]

[11] Patent Number: 5,832,368
[45] Date of Patent: Nov. 3, 1998

[54] BASE STATION SELECTION SCHEME FOR CDMA CELLULAR SYSTEM USING PERCH CHANNEL AND RECEIVED SIR

[75] Inventors: Etsuhiro Nakano; Akihiro Higashi, both of Yokosukashi; Fumio Kikuchi, Yokohamashi, all of Japan

[73] Assignee: NTT Mobile Communications Network Inc., Tokyo, Japan

[21] Appl. No.: 766,470

[22] Filed: Dec. 12, 1996

[30] Foreign Application Priority Data

Dec. 13, 1995 [JP] Japan .................................. 7-324768
Jan. 19, 1996 [JP] Japan .................................. 8-007792

[51] Int. Cl.$^6$ .................................................. H04B 7/26
[52] U.S. Cl. .............................. 455/63; 455/450; 455/62; 370/335
[58] Field of Search .................................. 455/422, 450, 455/452, 455, 62, 63, 67.1, 67.3, 447; 370/319, 320, 327, 329, 335, 340, 341, 342

[56] References Cited

U.S. PATENT DOCUMENTS 5,038,399  8/1991  Bruckert .................................. 455/447
5,093,924  3/1992  Toshiyuki et al. ...................... 455/67.3
5,603,092  2/1997  Stjerholm ................................ 455/63

OTHER PUBLICATIONS

Tomohiro DOHI, et al. "Performance of SIR Based Control in the Presence of Non-Uniform Traffic Distribution", 1995 Fourth IEEE International Conference on Universal Personal Communication Record, Tokyo, Japan, pgs. 334–338, Nov. 1995.

Primary Examiner—Thanh Cong Le
Attorney, Agent, or Firm—Oblon, Spivak, McClelland, Maier & Neustadt, P.C.

[57] ABSTRACT

A base station selection scheme for a CDMA cellular system capable of reducing the transmission power of the mobile station and increasing the subscriber capacity, by accounting for the uplink interference power at each base station. An uplink interference level is measured at each base station, while a perch channel is transmitted from each base station to the mobile station, and a perch channel reception level of the perch channel transmitted from each base station is measured at the mobile station. Then, a connection target base station to be connected with the mobile station is selected according to a received SIR (Signal to Interference Ratio) of each base station determined from the perch channel reception level measured at the mobile station and the uplink interference level measured at each base station.

20 Claims, 8 Drawing Sheets

FIG.4

| INTERFERENCE LEVEL MEASUREMENT RESULT | INTERFERENCE LEVEL INFORMATION |
|---|---|
| -20dB μ | 00000000 |
| -19dB μ | 00000001 |
| ... | ... |
| 30dB μ | 00110010 |
| ... | ... |
| 40dB μ | 00111100 |
| ... | ... |
| 50dB μ | 01000110 |
| ... | ... |
| 59dB μ | 01001111 |
| 60dB μ | 01010000 |

FIG.7

| BASE STATION ID | INTERFERENCE LEVEL INFORMATION |
|---|---|
| 1 | 00110010(30dB$\mu$) |
| 2 | 01000110(50dB$\mu$) |
| 3 | 00111100(40dB$\mu$) |

FIG.8

| INTERFERENCE LEVEL MEASUREMENT RESULT | PERCH CHANNEL TRANSMISSION POWER |
|---|---|
| -20dB$\mu$ | 60dBm |
| -19dB$\mu$ | 59dBm |
| ⋮ | ⋮ |
| 59dB$\mu$ | -19dBm |
| 60dB$\mu$ | -20dBm |

FIG.9

| PERCH CHANNEL RECEPTION LEVEL | PERCH CHANNEL RECEPTION LEVEL INFORMATION |
|---|---|
| -20dB$\mu$ | 00000000 |
| -19dB$\mu$ | 00000001 |
| ⋮ | ⋮ |
| 30dB$\mu$ | 00110010 |
| ⋮ | ⋮ |
| 40dB$\mu$ | 00111100 |
| ⋮ | ⋮ |
| 50dB$\mu$ | 01000110 |
| ⋮ | ⋮ |
| 59dB$\mu$ | 01001111 |
| 60dB$\mu$ | 01010000 |

FIG.10

| BASE STATION ID | PERCH CHANNEL RECEPTION LEVEL INFORMATION |
|---|---|
| 1 | 01000110(50dB$\mu$) |
| 2 | 01010000(60dB$\mu$) |
| 3 | 00110010(30dB$\mu$) |

BASE STATION SELECTION SCHEME FOR CDMA CELLULAR SYSTEM USING PERCH CHANNEL AND RECEIVED SIR

BACKGROUND OF THE INVENTION

1. Field of the Invention

The present invention relates to a base station selection scheme for a CDMA (Code Division Multiple Access) cellular system, and more particularly, to a base station selection scheme in which a perch channel transmitted from each base station is received at a mobile station, and a base station is selected according to a reception level of the perch channel.

2. Description of the Background Art

In the cellular system, a service area is formed by a plurality of small zones (cells), and these small zones are covered by a plurality of base stations, so that it is possible to achieve effects of a transmission power reduction and a subscriber capacity increase. In order to improve these effects, it is necessary to connect a mobile station with the closest base station. Since the mobile station and the base station are to be connected via a radio link, it is preferable to Judge which base station is closest to the mobile station according to a propagation loss between the mobile station and each base station.

For example, there is a conventional base station selection scheme for a cellular system which uses the perch channel. In this scheme, the perch channel transmitted from each base station is received at the mobile station, and the closest base station is selected by comparing the perch channel reception levels for different base stations. In other words, the base station for which the perch channel reception level is the largest is Judged as the closest base station.

In addition, at a time of the communication start and during the communication, the perch channel reception levels measured at the mobile station are reported to the closest base station or the base station currently in communication with the mobile station, and the base station selection is carried out at the closest base station or the base station currently in communication with the mobile station according to the reported perch channel reception levels.

Now, one radio access scheme that can be used in the cellular system is a CDMA scheme, and a use of the base station selection based on the perch channel reception level measurement in the CDMA is currently contemplated.

On the other hand, in the CDMA, the identical frequency is commonly used by a plurality of users, so that the signals of the other user cause the interference, and the receiving quality is determined by a ratio of the reception level and the interference level (SIR: Signal to Interference Ratio). Consequently, the transmission power control is indispensable in the CDMA, and the transmission power control based on the received SIR has been proposed in order to maintain a constant receiving quality (see, T. Dohi, et al: "Performance of SIR Based Power Control in the Presence of Non-uniform Traffic Distribution", 1995 Fourth IEEE International Conference on Universal Personal Communications Record, pp. 334–338, November 1995).

In addition, in the CDMA, it is preferable to suppress the transmission power as small as possible in order to reduce the interference as much as possible.

However, when the base station selection based on the perch channel reception level is carried out in the CDMA, the base station for which the perch channel reception level at that base station is the largest will be selected by assuming that the uplink and downlink propagation losses are equal, but the interference levels are different for different base stations, so that the transmission power of the mobile station may not necessarily becomes smallest when the mobile station is connected with the base station selected in this manner.

Thus, in a case of the CDMA, it is not always possible to select the most appropriate base station by the conventional base station selection scheme, and the base station selection according to the conventional base station selection scheme may lead to an increase of the transmission power and a degradation of the subscriber capacity.

SUMMARY OF THE INVENTION

It is therefore an object of the present invention to provide a base station selection scheme for a CDMA cellular system capable of reducing the transmission power of the mobile station and increasing the subscriber capacity, by accounting for the uplink interference power at each base station.

According to one aspect of the present invention there is provided a method of base station selection in a CDMA cellular system formed by a plurality of base stations connected with a communication network and at least one mobile station, comprising the steps of: measuring an uplink interference level at each base station; transmitting a perch channel from each base station to the mobile station; measuring a perch channel reception level of the perch channel transmitted from each base station at the mobile station; and selecting a connection target base station to be connected with the mobile station according to a received SIR (Signal to Interference Ratio) of each base station determined from the perch channel reception level measured at the mobile station and the uplink interference level measured at each base station.

According to another aspect of the present invention there is provided a CDMA cellular system with a base station selection function, comprising: a plurality of base stations connected with a communication network, each base station including: a device for measuring an uplink interference level at each base station; and a device for transmitting a perch channel from each base station; at least one mobile station, including: a device for measuring a perch channel reception level of the perch channel transmitted from each base station; and means for selecting a connection target base station to be connected with the mobile station according to a received SIR of each base station determined from the perch channel reception level measured at the mobile station and the uplink interference level measured at each base station.

Other features and advantages of the present invention will become apparent from the following description taken in conjunction with the accompanying drawings.

BRIEF DESCRIPTION OF THE DRAWINGS

FIG. 4 is a conversion table used at each base station according to a first base station selection scheme of the present invention.

FIG. 7 is a diagram showing a broadcast control information used at one base station according to a second base station selection scheme of the present invention.

FIG. 8 is a correspondence table used at each base station according to a third base station selection scheme of the present invention.

FIG. 9 is a conversion table used at a mobile station according to a fourth base station selection scheme of the present invention.

FIG. 10 is a diagram showing a perch channel reception level report information used at one base station according to a fourth base station selection scheme of the present invention.

DETAILED DESCRIPTION OF THE PREFERRED EMBODIMENTS

Referring now to FIG. 1 to FIG. 10, one embodiment of a base station selection scheme for a CDMA cellular system according to the present invention will be described in detail.

Figure 1:
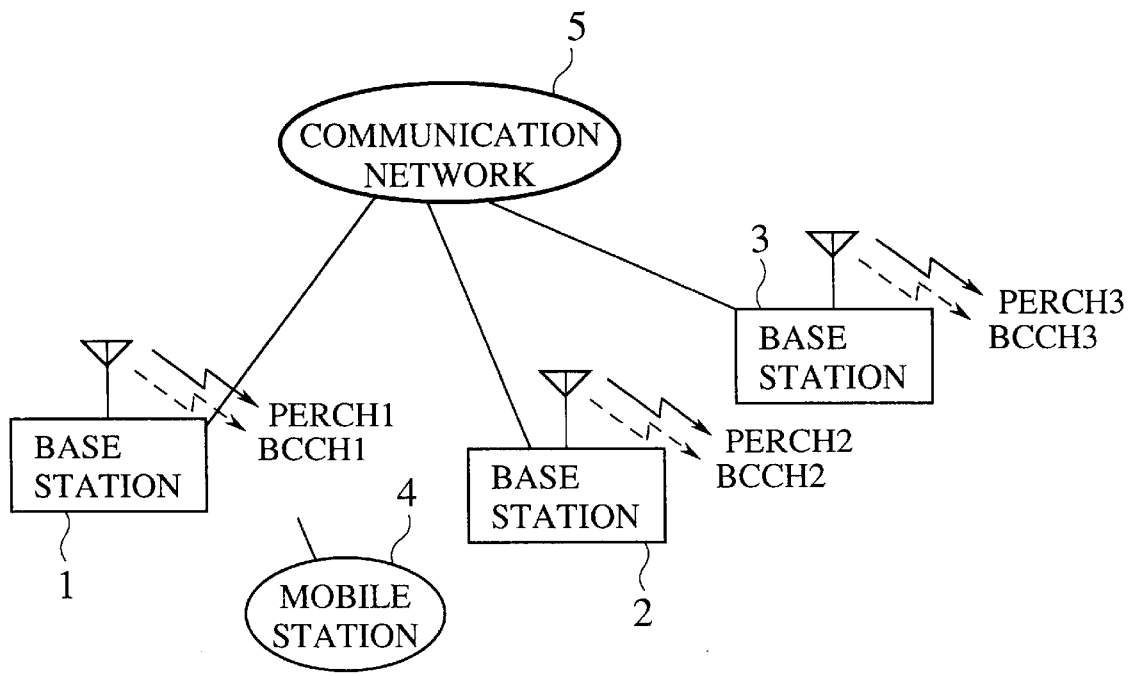
FIG. 1 is a schematic block diagram of an exemplary CDMA cellular system in one embodiment of the present invention.

FIG. 1 shows an exemplary configuration of a CDMA cellular system to which the base station selection scheme of this embodiment is applied. In this CDMA cellular system of FIG. 1, base stations 1 to 3 connected with a communication network 5 are transmitting perch channels PERCH1 to PERCH3 and broadcast control channels BCCH1 to BCCH3, respectively. A mobile station 4 measures reception levels of the perch channels transmitted from the base stations 1 to 3, and selects a connection target base station according to the measured reception levels.

Figure 2:
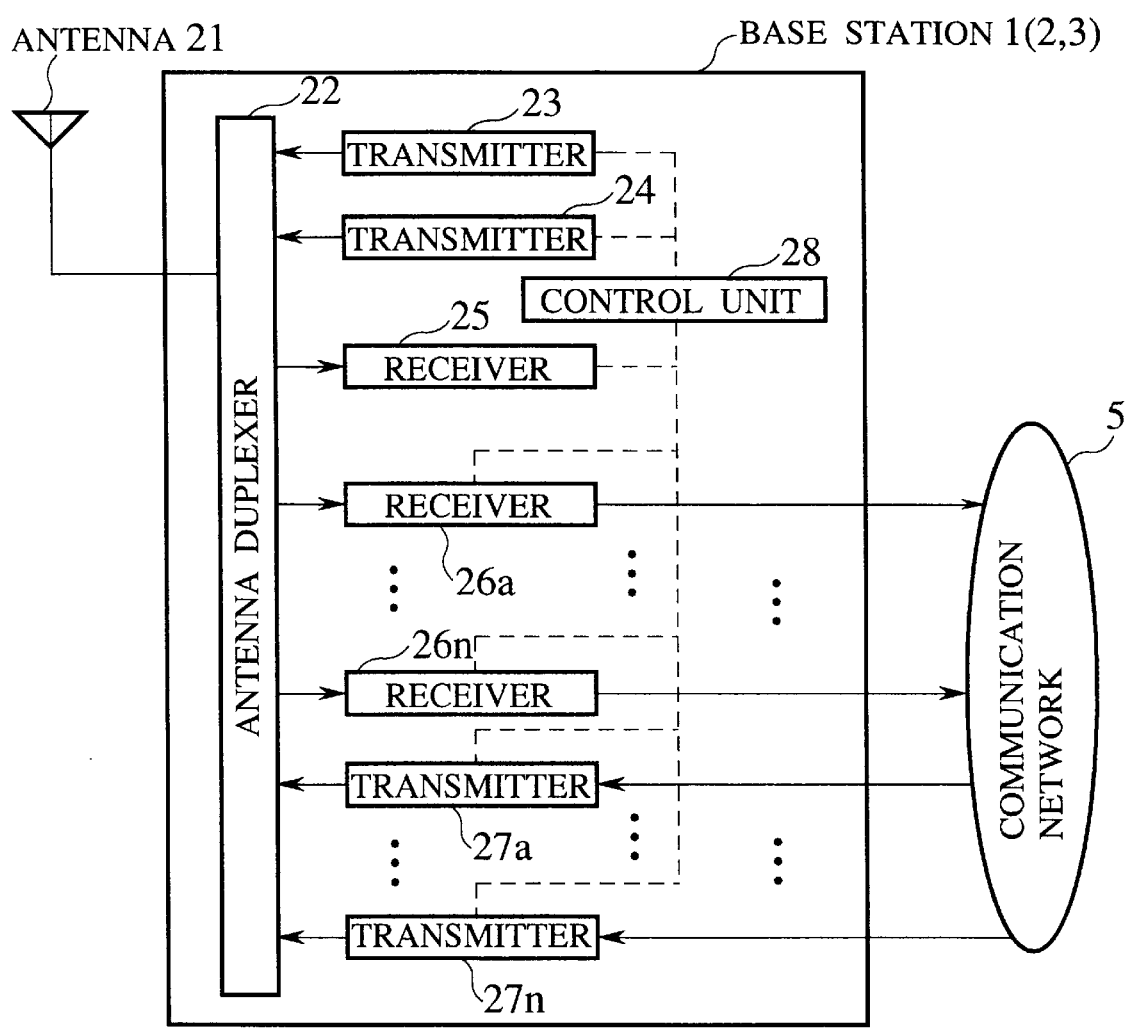
FIG. 2 is a block diagram of each base station in the CDMA cellular system of FIG. 1 in one embodiment of the present invention.

Each of the base station 1 to 3 has a configuration as shown in FIG. 2, which comprises an antenna 21 for transmitting and receiving radio signals to and from the mobile stations, an antenna duplexer 22 for enabling a use of the antenna 21 for both signal transmission and reception, a plurality of transmitters 23, 24 and 27a to 27n, a plurality of receivers 25 and 26a to 26n, and a control unit 28 for carrying out a control of each element of this base station, various data processing, and a control of signal transmission and reception for the purpose of communications with the mobile stations.

The transmitter 23 is used for transmitting the perch channel, while the transmitter 24 is used for transmitting the broadcast control channel. Note here that the perch channel and the broadcast control channel are separately provided in this embodiment, but it is also possible to provide them commonly.

The receiver 25 is used for measuring an uplink interference level, while the receivers 26a to 26n and the transmitters 27a to 27n are used for communications with the mobile stations. Signals received from the mobile stations by the receivers 26a to 26n are sent to the communication network 5, while signals sent from the communication network 5 are transmitted to the mobile stations by the transmitters 27a to 27n.

The control unit 28 produces an interference level information according to the interference level measured by the receiver 25, and controls the transmitter 24 to transmit the interference level information through the broadcast control channel.

Figure 3:
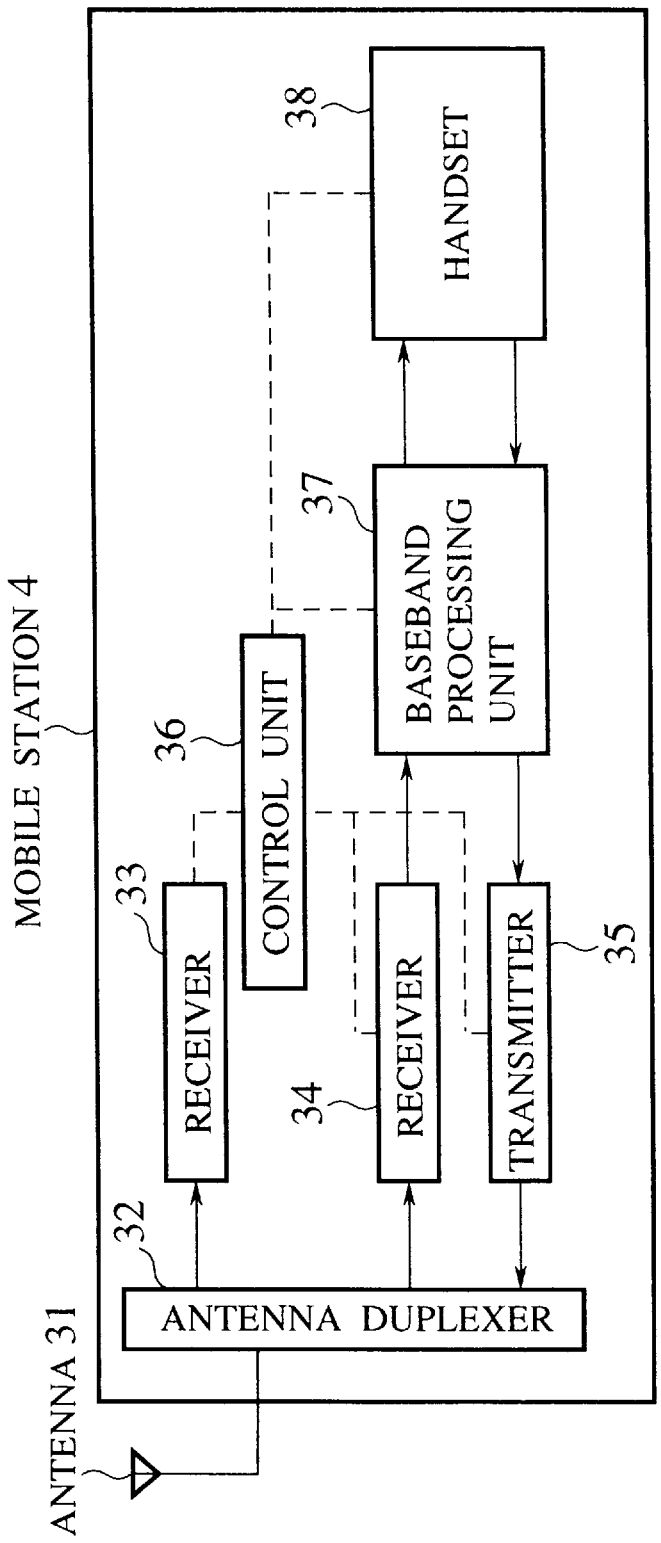
FIG. 3 is a block diagram of a mobile station in the CDMA cellular system of FIG. 1 in one embodiment of the present invention.

The mobile station 4 has a configuration as shown in FIG. 3, which comprises an antenna 31 for transmitting and receiving radio signals to and from the base stations, an antenna duplexer 32 for enabling a use of the antenna 31 for both signal transmission and reception, receivers 33 and 34, a transmitter 35, a control unit 36 for carrying out a control of each element of this mobile station and various data processing, a baseband processing unit 37, and a handset 38.

The receiver 33 is used for measuring reception levels of the perch channels transmitted by the base stations, and for receiving the broadcast control channels transmitted by the base stations. The receiver 34 receives speech data from the base stations, and the received speech data are converted into speech signals by the baseband processing unit 37 and sent to the handset 38. Also, the speech signals sent from the handset 38 are converted into speech data by the baseband processing unit 37 and transmitted to the base stations by the transmitter 35.

The control unit carries out the base station selection according to the perch channel reception levels measured by the receiver 33 and the interference level information received through the broadcast control channels, while controlling the transmitters 35, the receivers 33 and 34, the baseband processing unit 37 and the handset 38 for the purpose of communication with the base stations.

Figure 5:
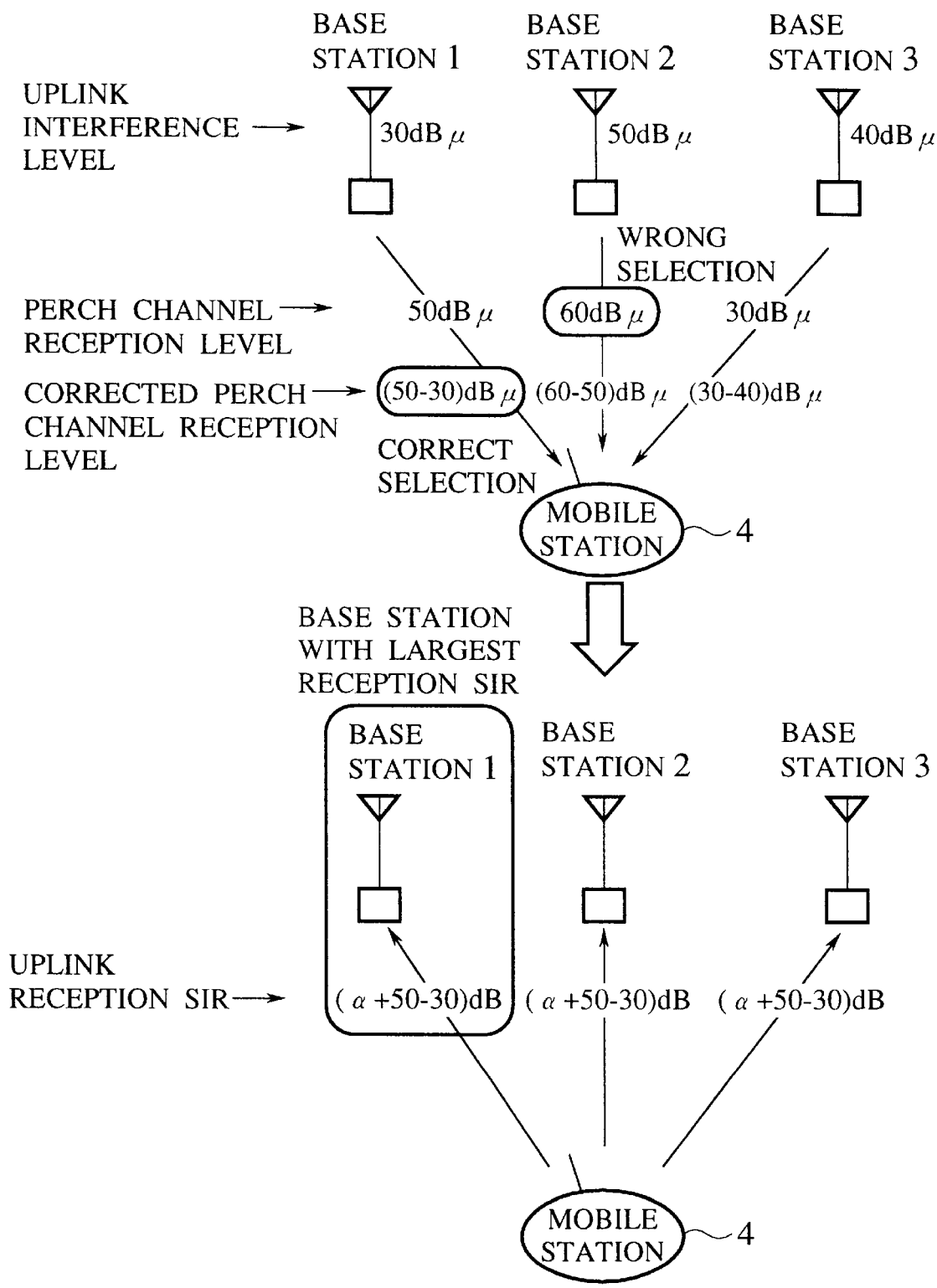
FIG. 5 is a diagram showing a manner of selecting a connection target base station according to a first base station selection scheme of the present invention.

Now, the first scheme for the mobile station 4 to select the connection target base station in the CDMA cellular system of FIG. 1 according to the present invention will be described with references to FIG. 4 and FIG. 5.

In this first scheme, the uplink interference level measured by the receiver 25 of the base station is converted into the interference level information by the control unit 28 of the base station according to a conversion table shown in FIG. 4, and the converted interference level information is transmitted by the transmitter 24. For example, as shown in FIG. 5, when the interference level measurement result at the base station 1 is 30 dB$\mu$, the interference level measurement result at the base station 2 is 50 dB$\mu$, and the interference level measurement result at the base station 3 is 40 dB$\mu$, the interference level information transmitted from the base stations 1 to 3 are "00110010" through BCCH1, "01000110" through BCCH2, and "00111100" through BCCH3.

The mobile station 4 receives these interference level information, corrects the measured perch channel reception levels according to these interference level information, and selects the connection target base station according to the corrected perch channel reception levels. For example, suppose that the perch channel reception level for PERCH1 is 50 dB$\mu$, the perch channel reception level for PERCH2 is 60 dB$\mu$, and the perch channel reception level for PERCH3 is 30 dB$\mu$, as indicated in FIG. 5. In this case, if the base station selection is made without the level correction, the base station 2 that has the largest perch channel reception level would be selected. However, when the mobile station 4 transmits signals at the same transmission power for all the base stations, the received SIR at the base station 1 is ($\alpha$+50−30) dB, the received SIR at the base station 2 is ($\alpha$+60−50) dB, and the received SIR at the base station 3 is ($\alpha$+30−40) dB, where $\alpha$ is an offset determined by the transmission power of the mobile station 4, so that the received SIR is actually the largest for the base station 1.

Consequently, the transmission power of the mobile station 4 can be made smaller by connecting the mobile station 4 with the base station 1 rather than the base station 2, but this optimal base station selection cannot be realized by the base station selection without the level correction.

For this reason, the following level correction is carried out at the mobile station 4 in this first scheme.

(1) [Corrected reception level of PERCH1]=[Uncorrected reception level of PERCH1]−[interference level of the base station 1];

(2) [Corrected reception level of PERCH2]=[Uncorrected reception level of PERCH2]−[interference level of the base station 2]; and (3) [Corrected reception level of PERCH3]=[Uncorrected reception level of PERCH3]−[interference level of the base station 3].

As a result of this level correction, the corrected reception level of PERCH1 becomes 20 dB$\mu$, the corrected reception level of PERCH2 becomes 10 dB$\mu$, and the corrected reception level of PERCH3 becomes −10 dB$\mu$, so that by selecting the base station with the largest corrected perch channel reception level as the connection target base station, it is possible to select the optimal base station 1 which has the largest received SIR.

Next, the second scheme for the mobile station 4 to select the connection target base station in the CDMA cellular system of FIG. 1 according to the present invention will be described with references to FIG. 6 and FIG. 7.

In the first scheme described above, there is a need for the mobile station 4 to receive the broadcast control channels transmitted by its surrounding base stations in order to obtain the interference level information of the surrounding base stations. In contrast, in this second scheme, each base station obtains the information level information of its surrounding base stations through the control unit 28 which is connected with the control units 28 of the surrounding base stations by a wire or radio control link 40 as shown in FIG. 6, and transmits the interference level information of this base station as well as the interference level information of its surrounding base stations through the broadcast control channel. Consequently, the mobile station 4 can obtain the interference level information of its surrounding base stations by simply receiving the broadcast control channel of the nearest base station alone.

For example, in this second scheme, the base station 1 transmits the broadcast control information as shown in FIG. 7, which indicates the interference level information of each base station in correspondence to a base station ID of each base station, for this base station 1 as well as for its surrounding base stations 2 and 3.

In this second scheme, the procedure for the level correction according to the obtained interference level information and the base station selection after the level correction is the same as in the first scheme described above.

Next, the third scheme for the mobile station 4 to select the connection target base station in the CDMA cellular system of FIG. 1 according to the present invention will be described with references to FIG. 8.

In this third scheme, the mobile station 4 can select the optimal base station without using the interference level information. Namely, in this third scheme, the control unit 28 of the base station specifies the perch channel transmission power to be used by the transmitter 23 in correspondence to the uplink interference level measurement result, according to a correspondence table shown in FIG. 8 which is stored in a table form at a memory within the control unit 28. As a result, each base station reduces the perch channel transmission power as much as the uplink interference level at each base station, so that the perch channel reception levels measured at the mobile station 4 reflect the interference levels at the base stations.

Consequently, in this third scheme, by simply selecting the base station with the largest perch channel reception level as the connection target base station at the mobile station 4, it is possible to select the optimal base station which has the largest received SIR, without requiring the level correction.

Next, the fourth scheme to select the connection target base station in the CDMA cellular system of FIG. 1 according to the present invention will be described with references to FIG. 9 and FIG. 10.

In this fourth scheme, the level correction for the perch channel reception level is carried out at the base station side.

Namely, in this fourth scheme, at the mobile station 4, the perch channel reception level measured by the receiver 33 is converted into a corresponding perch channel reception level information by the control unit 36, according to a conversion table shown in FIG. 9 which is stored in a memory (not shown) provided within the mobile station 4, and the converted perch channel reception level information is transmitted as a control signal to one base station by the transmitter 35. Here, this one base station is chosen by the mobile station 4 according to the measured perch channel reception levels, as a base station for which the measured perch channel reception level is largest. For example, in an exemplary case of FIG. 5 where the uplink interference levels and the perch channel reception levels are as described above, the mobile station 4 reports to the base station 2 the perch channel reception level report information as shown in FIG. 10, which indicates the perch channel reception level information of each base station in correspondence to a base station ID of each base station, for this base station 2 as well as for its surrounding base stations 1 and 3.

Figure 6:
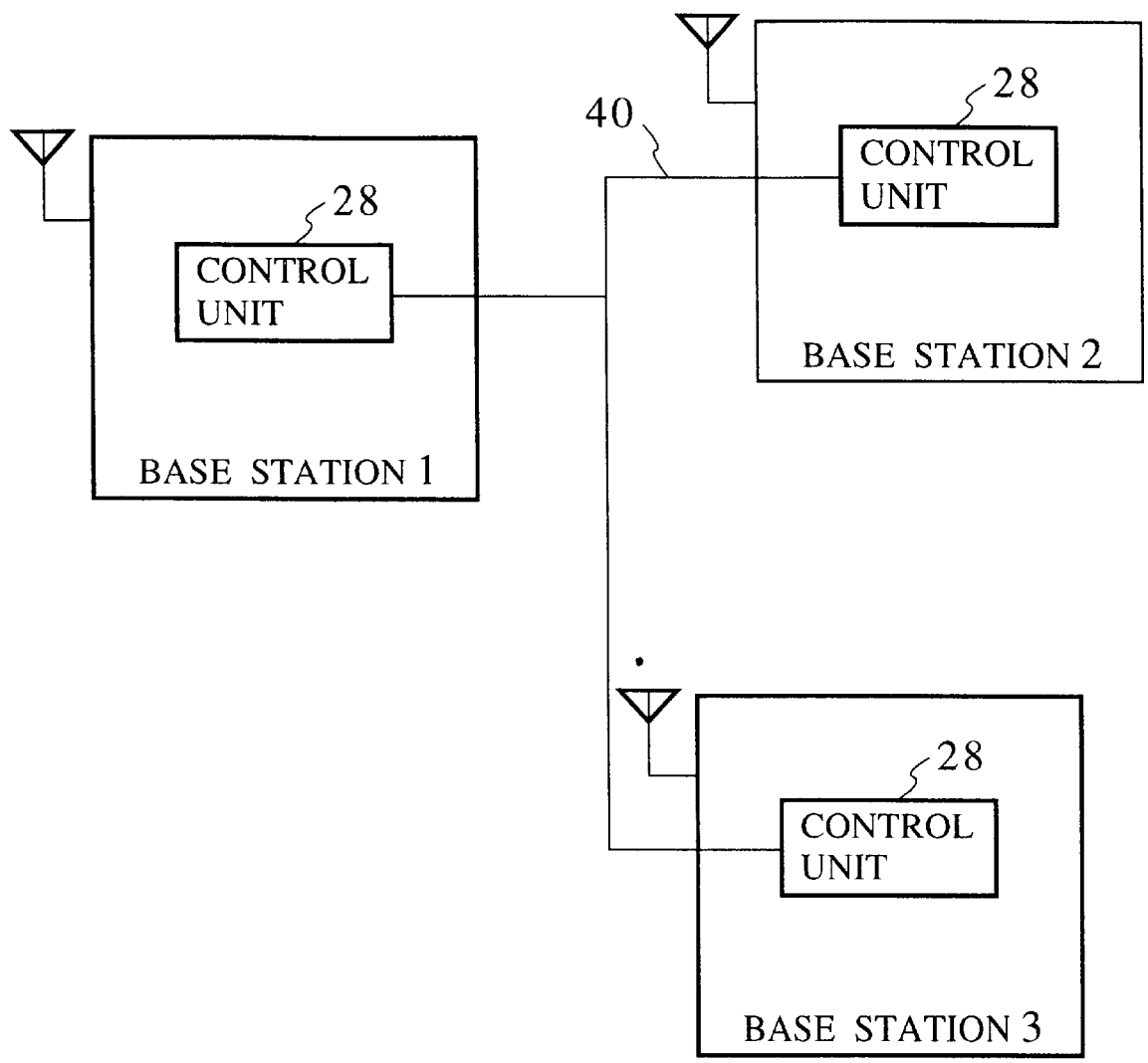
FIG. 6 is a diagram showing a manner of obtaining uplink interference levels of surrounding base stations at one base station according to a second base station selection scheme of the present invention.

Then, at the base station 2, the level correction for the perch channel reception levels reported from the mobile station 4 is carried out according to the uplink interference level (50 dB$\mu$) measured at this base station 2 as well as the uplink interference level (30 dB$\mu$) of the base station 1 and the uplink interference level (40 dB$\mu$) of the base station 3 which are obtained through the control unit 28 in a manner similar to that indicated in FIG. 6 described above, and the base station to be connected with the mobile station 4 is selected. More specifically, the level correction is carried out in this fourth scheme as follows.

(1) [Corrected reception level of PERCH1]=[Uncorrected reception level of PERCH1]−[interference level of the base station 1];

(2) [Corrected reception level of PERCH2]=[Uncorrected reception level of PERCH2]−[interference level of the base station 2]; and (3) [Corrected reception level of PERCH3]=[Uncorrected reception level of PERCH3]−[interference level of the base station 3].

As a result of this level correction, the corrected reception level of PERCH1 becomes 20 dB$\mu$, the corrected reception level of PERCH2 becomes 10 dB$\mu$, and the corrected reception level of PERCH3 becomes −10 dB$\mu$, so that by selecting the base station with the largest corrected perch channel reception level as the connection target base station, it is possible to select the optimal base station 1 which has the largest received SIR, without requiring the change of the perch channel transmission power and the interference level information transmission through the broadcast control channel.

As described, according to the first scheme described above, the mobile station corrects the perch channel reception level of each base station according to the uplink interference level information of each base station, and selects the base station according to the corrected perch channel reception levels, so that it is possible to select the optimal base station which can minimize the mobile station transmission power. Consequently, it is possible to reduce the power consumption and realize a longer communication possible period and/or a reduced size of the mobile station, while reducing the interference and increasing the subscriber capacity in the system.

Also, according to the second scheme described above, each base station obtains the uplink interference levels of the surrounding base stations and transmits the interference level information for this base station as well as for the surrounding base stations through the broadcast control channel, while the mobile station corrects the perch channel reception level of each base station according to the received interference level information and selects the base station according to the corrected perch channel reception levels, so that it is also possible to select the optimal base station which can minimize the mobile station transmission power. Consequently, it is possible to reduce the power consumption and realize a longer communication possible period and/or a reduced size of the mobile station, while reducing the interference and increasing the subscriber capacity in the system. In addition, it is sufficient for the mobile station to receive the broadcast control information from one base station alone, so that it is also possible to reduce the processing at the mobile station.

Also, according to the third scheme described above, each base station measures the uplink interference level and changes the perch channel transmission power according to the measured interference level, and the mobile station selects the base station according to the perch channel reception levels resulting from the changed perch channel transmission powers, so that it is also possible to select the optimal base station which can minimize the mobile station transmission power. Consequently, it is possible to reduce the power consumption and realize a longer communication possible period and/or a reduced size of the mobile station, while reducing the interference and increasing the subscriber capacity in the system. In addition, there is no need for each base station to transmit the interference level information through the broadcast control channel, and there is no need for the mobile station to carry out the level correction processing according to the interference levels, so that it is also possible to reduce the processing at the mobile station and the base station.

Also, according to the fourth scheme described above, each base station measures the uplink interference level and obtains the uplink interference levels of the surrounding base stations, corrects the perch channel reception levels reported from the mobile station according to the interference levels, and selects the base station according to the corrected perch channel reception levels, so that it is also possible to select the optimal base station which can minimize the mobile station transmission power. Consequently, it is possible to reduce the power consumption and realize a longer communication possible period and/or a reduced size of the mobile station, while reducing the interference and increasing the subscriber capacity in the system. In addition, there is no need for each base station to change the perch channel transmission power and to transmit the interference level information through the broadcast control channel, so that it is also possible to reduce the processing at the base station.

Thus, according to the present invention, the base station to be connected with the mobile station is selected according to the received SIR of each base station by accounting for the uplink interference level at each base station, so that it is also possible to select the optimal base station which can minimize the mobile station transmission power. Consequently, it is possible to reduce the power consumption and realize a longer communication possible period and/or a reduced size of the mobile station, while reducing the interference and increasing the subscriber capacity in the system.

It is to be noted that, in the above description for the first to third schemes of the connection target base station selection, the selection of the connection target base station is to be carried out at the mobile station, but it is also possible to modify the present invention in such a manner that the mobile station only selects candidate connection target base stations according to the scheme of the present invention as described above and then notifies the selected candidate connection target base stations to the base stations so that the final connection target base station selection can be made at the base station side. This modification can be used for a case of setting up a radio channel between the base station and the mobile station at a beginning of a communication where the final selection of the connection target base station also depends on the available idle communication channels which are managed at the base station side.

Note here that, in a case of the fourth scheme described above, the selection of the connection target base station should be carried out at the base station side, as should be apparent from the above description.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method of base station selection in a CDMA cellular system formed by a plurality of base stations connected with a communication network and at least one mobile station, comprising the steps of:

measuring an uplink interference level at each base station;

transmitting a perch channel from each base station to the mobile station;

measuring a perch channel reception level of the perch channel transmitted from each base station at the mobile station; and selecting a connection target base station to be connected with the mobile station according to a received SIR (Signal to Interference Ratio) of each base station determined from the perch channel reception level measured at the mobile station while accounting for the uplink interference level measured at each base station into the perch channel reception level measured at the mobile station.

2. The method of claim 1, further comprising the steps of:

transmitting a broadcast control channel indicating the uplink interference level measured at each base station, from each base station to the mobile station; and correcting the perch channel reception level for each base station measured at the mobile station according to the uplink interference level indicated by the broadcast control channel received from each base station, to obtain a corrected perch channel reception level for each base station;

wherein the selecting step selects the connection target base station according to the received SIR of each base station indicated by the corrected perch channel reception level for each base station.

3. The method of claim 2, wherein the correcting step is carried out at the mobile station.

4. The method of claim 1, further comprising the steps of:

obtaining at one base station the uplink interference levels measured by surrounding base stations;

transmitting a broadcast control channel indicating the uplink interference levels of said one base station and the surrounding base stations, from said one base station to the mobile station; and correcting the perch channel reception level for each base station measured at the mobile station according to the uplink interference level indicated by the broadcast control channel received from said one base station, to obtain a corrected perch channel reception level for each base station;

wherein the selecting step selects the connection target base station according to the received SIR of each base station indicated by the corrected perch channel reception level for each base station.

5. The method of claim 4, wherein the correcting step is carried out at the mobile station.

6. The method of claim 1, further comprising the step of:

changing a perch channel transmission power of the perch channel transmitted by each base station according to the uplink interference level measured by each base station;

wherein the selecting step selects the connection target base station according to the received SIR of each base station indicated by the perch channel reception level for each base station measured by the mobile station which reflects the uplink interference level measured by each base station.

7. The method of claim 1, further comprising the steps of:

reporting the perch channel reception level for each base station measured by the mobile station, from the mobile station to one base station;

obtaining at said one base station the uplink interference levels measured by surrounding base stations;

correcting the perch channel reception level for each base station reported from the mobile station according to the uplink interference levels of said one base station and the surrounding base stations, to obtain a corrected perch channel reception level for each base station;

wherein the selecting step selects the connection target base station according to the received SIR of each base station indicated by the corrected perch channel reception level for each base station.

8. The method of claim 7, wherein the correcting step is carried out by said one base station.

9. The method of claim 7, wherein said one base station is one of said plurality of base stations which is chosen by the mobile station according to the perch channel reception level for each base station measured by the mobile station.

10. The method of claim 7, wherein said one base station is one of said plurality of base stations for which the perch channel reception level measured by the mobile station is largest.

11. A CDMA cellular system with a base station selection function, comprising:

a plurality of base stations connected with a communication network, each base station including:

a device for measuring an uplink interference level at each base station; and a device for transmitting a perch channel from each base station;

at least one mobile station, including:

a device for measuring a perch channel reception level of the perch channel transmitted from each base station; and means for selecting a connection target base station to be connected with the mobile station according to a received SIR (Signal to Interference Ratio) of each base station determined from the perch channel reception level measured at the mobile station while accounting for the uplink interference level measured at each base station into the perch channel reception level measured at the mobile station.

12. The system of claim 11, further comprising:

a device included in each base station for transmitting a broadcast control channel indicating the uplink interference level measured at each base station, from each base station to the mobile station; and means for correcting the perch channel reception level for each base station measured at the mobile station according to the uplink interference level indicated by the broadcast control channel received from each base station, to obtain a corrected perch channel reception level for each base station;

wherein the selecting means selects the connection target base station according to the received SIR of each base station indicated by the corrected perch channel reception level for each base station.

13. The system of claim 12, wherein the correcting means is provided at the mobile station.

14. The system of claim 11, further comprising:

means for obtaining at one base station the uplink interference levels measured by surrounding base stations;

a device included in said one base station for transmitting a broadcast control channel indicating the uplink interference levels of said one base station and the surrounding base stations, from said one base station to the mobile station; and means for correcting the perch channel reception level for each base station measured at the mobile station according to the uplink interference level indicated by the broadcast control channel received from said one base station, to obtain a corrected perch channel reception level for each base station;

wherein the selecting means selects the connection target base station according to the received SIR of each base station indicated by the corrected perch channel reception level for each base station.

15. The system of claim 14, wherein the correcting means is provided at the mobile station.

16. The system of claim 11, further comprising:

a device included in each base station for changing a perch channel transmission power of the perch channel transmitted by each base station according to the uplink interference level measured by each base station;

wherein the selecting means selects the connection target base station according to the received SIR of each base station indicated by the perch channel reception level for each base station measured by the mobile station which reflects the uplink interference level measured by each base station.

17. The system of claim 11, further comprising:
a device included in the mobile station for reporting the perch channel reception level for each base station measured by the mobile station, from the mobile station to one base station;
means for obtaining at said one base station the uplink interference levels measured by surrounding base stations;
means for correcting the perch channel reception level for each base station reported from the mobile station according to the uplink interference levels of said one base station and the surrounding base stations, to obtain a corrected perch channel reception level for each base station;
wherein the selecting means selects the connection target base station according to the received SIR of each base station indicated by the corrected perch channel reception level for each base station.

18. The system of claim 17, wherein the correcting means is provided at said one base station.

19. The system of claim 17, wherein said one base station is one of said plurality of base stations which is chosen by the mobile station according to the perch channel reception level for each base station measured by the mobile station.

20. The system of claim 17, wherein said one base station is one of said plurality of base stations for which the perch channel reception level measured by the mobile station is largest.

* * * * *